(12) United States Patent
Husemann et al.

(10) Patent No.: US 8,062,458 B2
(45) Date of Patent: Nov. 22, 2011

(54) METHOD FOR STAMPING THERMALLY ACTIVATABLE ADHESIVE MATERIALS WHICH ARE NOT TACKY AT ROOM TEMPERATURE

(75) Inventors: Marc Husemann, Hamburg (DE); Frank Hannemann, Hamburg (DE)

(73) Assignee: tesa SE, Hamburg (DE)

( * ) Notice: Subject to any disclaimer, the term of this patent is extended or adjusted under 35 U.S.C. 154(b) by 38 days.

(21) Appl. No.: 12/374,805

(22) PCT Filed: Jun. 29, 2007

(86) PCT No.: PCT/EP2007/056529
§ 371 (c)(1),
(2), (4) Date: Jan. 23, 2009

(87) PCT Pub. No.: WO2008/012166
PCT Pub. Date: Jan. 31, 2008

(65) Prior Publication Data
US 2009/0283209 A1 Nov. 19, 2009

(30) Foreign Application Priority Data

Jul. 28, 2006 (DE) .......................... 10 2006 035 787

(51) Int. Cl.
*B29C 65/52* (2006.01)
*B32B 37/14* (2006.01)
*B32B 38/04* (2006.01)

(52) U.S. Cl. ........ 156/253; 156/257; 156/264; 156/268; 156/270; 156/248; 156/308.2

(58) Field of Classification Search .................. 156/253, 156/257, 264, 268, 270, 248, 308.2
See application file for complete search history.

(56) References Cited

U.S. PATENT DOCUMENTS

| | | | |
|---|---|---|---|
| 3,326,741 | A | 6/1967 | Olson |
| 3,639,500 | A | 2/1972 | Muny et al. |
| 4,404,246 | A | 9/1983 | Charbonneau et al. |
| 4,404,345 | A | 9/1983 | Janssen |
| 4,452,955 | A | 6/1984 | Boeder |
| 4,545,843 | A | 10/1985 | Bray |
| 4,880,683 | A | 11/1989 | Stow |
| 5,491,012 | A | 2/1996 | Lühmann et al. |
| 5,593,759 | A | 1/1997 | Vargas et al. |
| 6,531,024 | B1 * | 3/2003 | Braun .......................... 156/277 |
| 2006/0228480 | A1 * | 10/2006 | Lin ............................... 427/275 |
| 2008/0166554 | A1 | 7/2008 | Husemann et al. |

FOREIGN PATENT DOCUMENTS

| | | |
|---|---|---|
| EP | 0578979 | 1/1994 |
| WO | 02090317 | 11/2002 |
| WO | 2005063909 | 7/2005 |
| WO | 2007012656 | 2/2007 |

* cited by examiner

*Primary Examiner* — Linda L Gray
(74) *Attorney, Agent, or Firm* — Norris McLaughlin & Marcus PA

(57) ABSTRACT

Method for producing diecuts from heat-activatable adhesive films which comprises applying a layer of heat-activatable adhesive material to a carrier material having a glass transition temperature at least 20° C. lower that that of the adhesive, laminating the heat-activatable layer onto a release liner at a temperature between the glass transition temperature of the release liner and heat activatable adhesive and then diecutting the heat-activatable adhesive layer on the release liner.

5 Claims, No Drawings

METHOD FOR STAMPING THERMALLY ACTIVATABLE ADHESIVE MATERIALS WHICH ARE NOT TACKY AT ROOM TEMPERATURE

This application is a 371 of PCT/EP2007/056529, filed 29 Jun. 2007, which claims foreign priority benefit under 35 U.S.C. §119 of the German Patent Application No. 10 2006035 787.6 filed 28 Jul. 2006.

The invention relates to a method of producing stamped products (diecuts) from heat-activatable adhesives, and also to the use of innovative release liners.

BACKGROUND OF THE INVENTION

Heat-activatable adhesives very often replace pressure-sensitive adhesive tapes in operations where the tapes are required to withstand high temperatures or where very high bond strengths are needed.

Heat-activatable adhesives possess such properties because they have no tack at room temperature and become soft and tacky only with an accompanying increase in temperature. For the mediation of adhesion (for the formation of an adhesive layer), heat-activatable adhesive sheets require application of heat and in general—as for all pressure-sensitive or self-adhesive materials—the application of a certain pressure. In general a distinction is made between thermoplastic and thermally reactive heat-activatable adhesives.

Thermoplastic heat-activatable films are based on the concept that these films are hard at room temperature and then, under heat and pressure, soften, flow on the substrate and then become solid again with accompanying cooling. Thereafter the adhesion to the substrate to be bonded is high, as a result of the wetting process of the adhesive.

In the case of the thermally reactive heat-activatable adhesives, the process that operates is the same in analogy to the thermoplastic heat-activatable adhesives. Additionally here, though, in the course of temperature activation, a crosslinking reaction is initiated which results in the thermally reactive heat-activatable adhesives curing, and hence leads to an increased bond strength.

As a result of the properties described above, heat-activatable adhesives are often used for bonds of metals, or of metals with plastics. This also concerns the electronics industry, with the consequence that heat-activatable adhesives are being used increasingly in the form of diecuts (products from stamping operations).

The production of such diecuts in diecutting processes, however, is not entirely trivial, for reasons including the fact that heat-activatable films cannot, like pressure-sensitive adhesives, simply be transfer-laminated to a desired liner, since at room temperature the pressure-sensitive adhesion is absent. This process generally does not function even with highly graduated release liners in conjunction with a hot-laminating operation.

Nevertheless, within the electronics industry, there is a need to produce such diecuts; in particular to the exclusion of disruptive, unwanted paper fibers, or, for sensitive applications, without silicone. Since a very large number of heat-activatable adhesives are typically furnished with glassine release liners, the aforementioned problem is manifested to a particular degree. There is therefore a need for a general diecutting process for heat-activatable adhesives that operates to the exclusion of paper release liners.

It is an object of the invention, therefore, to offer a method of producing diecuts from heat-activatable adhesives that avoids, or at least minimizes, the disadvantages of the prior art. A particular aim is to avoid the presence of paper as a carrier material in the diecutting operation itself. Advantageously it is to be possible to optimize the partability of the diecuts from the carrier material for the particular intended application.

SUMMARY OF THE INVENTION

The object is achieved by means of a specific production method for the diecuts, using specific release liners.

Accordingly the invention provides a method of processing a heat-activatable adhesive which is being coated onto a release liner, comprising an operation of hot transfer lamination onto one of these release liners, with a subsequent diecutting operation.

The main claim accordingly relates to a method of producing diecuts from heat-activatable adhesive films, characterized in that a) a heat-activatable adhesive is coated initially onto a first carrier material,
b) the heat-activatable adhesive layer, in a subsequent step of the method, is laminated onto a temporary carrier material (release liner) with accompanying exposure to heat,
the release liner having at least one polyolefin-based surface, and the polyolefinic surface being nontacky at room temperature and being itself activatable, with accompanying exposure to heat, in such a way that it has pressure-sensitive adhesive properties,
c) and the heat-activatable adhesive layer on the release liner is subjected to a diecutting operation.

The dependent claims relate to developments of this method.

A further claim relates, moreover, to the use of a layer of a heat-activatable film having at least one polyolefin-based surface which is nontacky at room temperature and is activatable, with accompanying exposure to heat, in such a way that it has pressure-sensitive adhesive properties as a temporary carrier material (release liner) for heat-activatable adhesives.

DETAILED DESCRIPTION

Diecuts are converted (especially two-dimensional) adhesive film shapes which have been produced in a diecutting operation. The actual shape, size, and thickness of the diecuts is in principle not restricted, and may be adapted for the particular intended application.

Release liners in the sense of this specification are temporary carrier materials, i.e., layers of materials on which the heat-activatable adhesive is deposited temporarily and from which the adhesive thereafter—with greater or lesser ease—can be detached again without residue. Release liners of this kind are known in particular as liner materials of adhesive strips which are wound into a roll; in that application, the release liners prevent the individual winds of the adhesive strip from sticking to one another permanently.

For the diecutting process it may additionally be of advantage if the heat-activatable film is additionally lined with a liner, such as a PET liner, for example. The hot-laminating operation softens the polyolefinic side of the release liner, and a slight pressure-sensitive adhesion is developed, which then results in the heat-activatable film adhering to this layer. Surprisingly, on hot application, the heat-activatable adhesive can be laminated again outstandingly from the release liner onto the desired substrate for bonding.

A further aspect of the invention are developments of the method of the invention, in respect especially of techniques which can be used outstandingly for the laminating operation.

Thus, for example, pressing rolls or pressure rolls with temperature-resistant rubberizing are particularly suitable for the laminating operation.

Heat-Activatable Adhesives:

The heat-activatable adhesive used for producing the adhesive diecuts in the method of the invention is to be characterized in that it has no intrinsic tack at room temperature and is therefore different from conventional pressure-sensitive adhesives (PSAs). Another characteristic of the heat-activatable adhesive is that it develops tack only when heat is introduced, and thus then acts as an adhesive. Adhesives of this kind differ substantially from heat-activatable adhesives which are pressure-sensitively adhesive at room temperature, of the kind known from the prior art.

A feature of the heat-activatable adhesive is that it becomes tacky with accompanying exposure to temperature, and optionally with exposure to pressure, and develops a high bond strength by solidification after bonding and cooling. Depending on the chemical nature of the heat-activatable adhesives, they have different static glass transition temperatures $T_{g,A}$ or melting points $T_{m,A}$, which significantly determine the application temperature for bonding and for hot transfer lamination.

The heat-activatable adhesives can have different polymer structures. In a first preferred embodiment, poly(meth)acrylate-based heat-activatable adhesives are employed. Great preference is given to using poly(meth)acrylate adhesives which are composed of polymers made from at least the following monomers a1) 70% to 100% by weight of acrylic esters and/or methacrylic esters and/or free acids thereof, with the following formula $CH_2=CH(R_1)(COOR_2)$, where $R_1$=H and/or $CH_3$ and $R_2$=H and/or aliphatic hydrocarbon chains having 1 to 30 C atoms.

Additionally it is possible, for preparing the polymers, to add, optionally, as monomers a2) up to 30% by weight of olefinically unsaturated monomers having functional groups, in order to be able to vary the properties—especially the adhesive and viscosity properties—of the adhesives.

One very preferred procedure uses, in the sense of the monomers a1), acrylic monomers comprising acrylic and methacrylic esters with alkyl groups composed of 1 to 14 C atoms. Specific examples, without wishing to be restricted by this enumeration, are methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and their branched isomers, such as 2-ethylhexyl acrylate, for example. Further classes of compound to be used, which may likewise be added in small amounts under a1), are cyclohexyl methacrylates, isobornyl acrylate, and isobornyl methacrylates.

One advantageous variant uses for a2) acrylic monomers corresponding to the following general formula

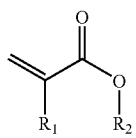

where $R_1$ is H and/or $CH_3$ and the radical —$OR_2$ represents or constitutes a functional group which supports subsequent UV crosslinking of the PSA, which, for example, in one particularly preferred version, possesses an H-donor effect.

Particularly preferred examples for the component a2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glyceridyl methacrylate, benzyl acrylate, benzyl methacrylate, phenyl acrylate, phenyl methacrylate, t-butylphenyl acrylate, t-butyl-phenyl methacrylate, phenoxyethyl acrylate, phenoxy-ethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxy-methyl)methacrylamide, N-methylolacrylamide, N-(ethoxy-methyl) acrylamide, N-isopropylacrylamide, vinylacetic acid, tetrahydrofurfuryl acrylate, β-acryloyloxy-propionic acid, trichloroacrylic acid, fumaric acid, crotonic acid, aconitic acid, dimethylacrylic acid; this enumeration should not be taken as being conclusive.

In a further preferred embodiment use is made, for the component a2), of aromatic vinyl compounds, it being possible for the aromatic nuclei to be composed preferably of $C_4$ to $C_{18}$ building blocks and also to contain heteroatoms. Particularly preferred examples are styrene, 4-vinylpyridine, N-vinylphthalimide, methylstyrene, 3,4-dimethoxystyrene, 4-vinylbenzoic acid; this enumeration is not conclusive.

For the polymerization the monomers are chosen such that the resulting polymers can be used as heat-activatable adhesives.

For these applications the glass transition temperature of the resulting polymer is above room temperature, advantageously above 30° C.

For purely crystalline systems there is a thermal equilibrium between crystal and liquid at the melting point $T_{m,A}$. Amorphous or partly crystalline systems, in contrast, are characterized by the transformation of the more or less hard, amorphous or partially crystalline phase into a softer (rubber-like to viscous) phase. At the glass point, particularly in the case of polymeric systems, there is a "thawing" (or "freezing" in the case of cooling) of the Brownian molecular motion of relatively long chain segments.

The transition from the melting point $T_{m,A}$ (which is actually defined only for purely crystalline systems; "polymer crystals") to the glass transition point $T_{g,A}$ can therefore be regarded as being fluid, depending on the fraction of the partial crystallinity of the sample under investigation.

The context of this specification, and in the sense of the observations above, the designation "glass transition temperature" and the specifying of the corresponding numerical values encompasses not only the statical glass transition temperature but also the melting point, depending on the nature of the system under investigation.

The values given for the glass transition temperature (static glass transition temperature, melting point) in this specification refer to its determination by means of calorimetric measurement (DSC; dynamic scanning calorimetry (dynamic differential calorimetry); cf. in particular DIN 53765: 1994-03).

In accordance with the remarks above, for the purpose of obtaining a polymer glass transition temperature $T_{g,A} \geq 30°$ C., the monomers are very preferably selected, and the quantitative composition of the monomer mixture advantageously chosen, such that the desired $T_{g,A}$ for the polymer is produced in accordance with equation (E1), in analogy to the Fox equation (cf. T. G. Fox, Bull. Am. Phys. Soc. 1 (1956) 123).

$$\frac{1}{T_g} = \sum_n \frac{w_n}{T_{g,n}} \quad \text{(E1)}$$

In this equation, n represents the serial number of the monomers used, $w_n$ the mass fraction of the respective monomer n (% by weight), and $T_{g,n}$ the respective glass transition temperature of the homopolymer formed from the respective monomers n, in K.

The various preparation processes (polymerization processes) for polyacrylate adhesives of this kind are described later on below.

In a further preferred procedure, adhesives based on polyolefins, especially poly-α-olefins, are used for the heat-activatable adhesive.

The polyolefin-based heat-activatable adhesives preferably have glass transition temperatures of +75° C. to 180° C. The bond strength of these polymers can be increased by deliberate additization. Thus, for example, polyimine copolymers or polyvinyl acetate copolymers can be used as bond strength promoter additives.

To achieve the desired glass transition temperature, the monomers employed, and also their quantities, are again preferably chosen, here as well, such that the desired temperature results when equation (E1) is applied.

For a practical application it is advantageous to further restrict the glass transition temperature of the heat-activatable adhesive. If the temperature were to be too low, the risk would be that, in the course of dispatch or during transport, the adhesive tape would begin to melt at elevated temperatures, and the adhesive tape would no longer be able to be unwound. In order to find an optimum range it is possible to vary the molecular weight and also the comonomer composition of the monomers when preparing the adhesives. In order to set a low glass transition temperature, polymers having a medium or low molecular weight are used. In addition, low molecular weight and high molecular weight polymers can be mixed with one another. Particularly preferred procedures use polyethenes, polypropenes, polybutenes, polyhexenes or copolymers of polyethene, polypropene, polybutene or polyhexene.

Polethylene and polyethylene copolymers can be coated in the form, for example, of aqueous dispersions. The mixture used is dependent in turn on the desired glass transition temperature of the heat-activatable adhesive.

Available commercially from the company Degussa under the trade name Vestoplast™ are various heat-activatable poly-α-olefins. Propene-rich grades are offered under the names Vestoplast™ 703, 704, 708, 750, 751, 792, 828, 888 or 891. These grades possess melting points $T_{m,A}$ of 99 to 162° C. In addition there are also butene-rich grades, available commercially under the names Vestoplast™ 308, 408, 508, 520, and 608. They possess melting points $T_{m,A}$ of 84 to 157° C.

Further examples of heat-activatable PSAs are described in the specifications U.S. Pat. No. 3,326,741, U.S. Pat. No. 3,639,500, U.S. Pat. No. 4,404,246, U.S. Pat. No. 4,452,955, U.S. Ser. No. 44/043,345, U.S. Pat. No. 4,545,843, U.S. Pat. No. 4,880,683, and U.S. Pat. No. 5,593,759. In these specifications there are likewise references to further temperature-activatable PSAs.

In a further variant embodiment of the invention the heat-activatable adhesive is composed of at least one elastomer component and at least one reactive resin component. Elastomers used are, in particular, synthetic rubbers, such as polyvinyl butyral, polyvinyl formal, nitrile rubbers, nitrile-butadiene rubbers, hydrogenated nitrile-butadiene rubbers, polyacrylate rubbers, chloroprene rubbers, ethylene-propylene-diene rubbers, methyl-vinyl-silicone rubbers, fluorosilicone rubbers, tetrafluoroethylene-propylene copolymer rubbers, butyl rubbers, and styrene-butadiene rubbers, for example.

Nitrile-butadiene rubbers are available for example as Europrene™ from Eni Chem, or as Krynac™ from Bayer, or as Breon™ and Nipol N™ from Zeon. Polyvinyl butyrals are available as Butvar™ from Solucia, as Pioloform™ from Wacker, and as Mowital™ from Kuraray. Hydrogenated nitrile-butadiene rubbers are available for example as Therban™ from Bayer and as Zetpol™ from Zeon. Polyacrylate rubbers are available for example as Nipol AR™ from Zeon. Chloroprene rubbers are available for example as Baypren™ from Bayer. Ethylene-propylene-diene rubbers are available for example as Keltan™ from DSM, as Vistalon™ from Exxon Mobile, and as Buna EP™ from Bayer. Methyl-vinyl-silicone rubbers are available for example as Silastic™ from Dow Corning and as Silopren™ from GE Silicones. Fluorosilicone rubbers are available for example as Silastic™ from GE Silicones. Butyl rubbers are available for example as Esso Butyl™ from Exxon Mobile. Styrene-butadiene rubbers are available for example as Buna S™ from Bayer, and Europrene™ from Eni Chem, and as Polysar S™ from Bayer.

Polyvinyl formals are available for example as Formvar™ from Ladd Research.

The synthetic rubbers preferably possess a glass transition temperature of between −80° C. and 0° C. In addition it is also possible to use mixtures with thermoplastics and elastomers.

The thermoplastic materials are chosen preferably from the group of the following polymers: polyurethanes, polystyrene, acrylonitrile-butadiene-styrene terpolymers, polyesters, unplasticized polyvinyl chlorides, plasticized polyvinyl chlorides, polyoxy-methylenes, polybutylene terephthalates, poly-carbonates, fluorinated polymers, such as polytetrafluoroethylene, for example, polyamides, ethylene-vinyl acetates, polyvinyl acetates, polyimides, polyethers, copolyamides, copolyesters, polyolefins, such as polyethylene, polypropylene, polybutene, polyisobutene, for example, and poly(meth)acrylates. The enumeration makes no claim to completeness.

In one preferred embodiment these thermoplastic materials possess a glass transition temperature of between +60° C. and +125° C.

To optimize the adhesive properties and the activation range it is possible optionally to add bond strength promoter resins and/or reactive resins. The fraction of the resins is between 75% and 25% by weight, based on the overall mixture of elastomer and resin.

As tackifying resins for addition it is possible to use the tackifier resins that are already known and described in the literature. Representatives include the pinene and indene resins, rosins, their disproportionated, hydrogenated, polymerized, esterified derivatives and salts, the aliphatic and aromatic hydrocarbon resins, terpene resins and terpenephenolic resins, and also C5, C9, and other hydrocarbon resins. Any desired combinations of these and further resins may be used in order to adjust the properties of the resulting adhesive in accordance with requirements. Generally speaking it is possible to use all resins that are compatible (soluble) with the elastomer; reference may be made in particular to all aliphatic, aromatic, alkylaromatic hydrocarbon resins, hydrocarbon resins based on pure monomers, hydrogenated hydrocarbon resins, functional hydrocarbon resins, and natural resins.

In a further variant embodiment, reactive resins are added additionally or alternatively to the elastomer. By reactive resins are meant those resins which contain functional groups which under activation, especially thermal activation, are able to enter into chemical reactions, especially crosslinking reactions. One very preferred group from which the reactive resins can be chosen encompasses epoxy resins. The molecular weight of the epoxy resins varies from 100 g/mol up to a maximum of 10 000 g/mol for polymeric epoxy resins.

The epoxy resins comprise, for example, epichlorohydrin, glycidyl esters, the reaction product of epichlorohydrin and p-aminophenol, and/or the reaction product of bisphenol A and epichlorohydrin.

Preferred commercial examples are, for example, Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031 etc. from Shell Chemical, and HPT™ 1071, HPT™ 1079, likewise from Shell Chemical.

Examples of commercial aliphatic epoxy resins are, for example, vinylcyclohexane dioxides, such as ERL-4206, ERL-4221, ERL 4201, ERL-4289 or ERL-0400 from Union Carbide Corp.

As novolak resins it is possible for example to use Epi-Rez™ 5132 from Celanese, ESCN-001 from Sumitomo Chemical, CY-281 from Ciba Geigy, DEN™ 431, DEN™ 438, Quatrex 5010 from Dow Chemical, RE 305S from Nippon Kayaku, Epiclon™ 673 from DaiNipon Ink Chemistry or Epicote™ 152 from Shell Chemical.

Furthermore, melamine resins as well can be used as reactive resins, such as Cymel™ 327 and 323 from Cytec, for example.

As reactive resins it is also possible, furthermore, to use terpene-phenolic resins, such as NIREZ™ 2019 from Arizona Chemical, for example.

As reactive resins it is also possible, furthermore, to use phenolic resins, such as YP 50 from Toto Kasei, PKHC from Union Carbide Corp., and BKR 2620 from Showa Union Gosei Corp., for example. As reactive resins it is also possible, furthermore, to use phenol resole resins, both alone and in combination with other phenolic resins.

As reactive resins it is also possible, furthermore, to use polyisocyanates, such as Coronate™ L from Nippon Polyurethan Ind., Desmodur™ N3300 or Mondur™ 489 from Bayer, for example.

In order to accelerate the reaction between the two components it is also possible, optionally, to additize crosslinkers and accelerators into the mixture.

Examples of suitable accelerators include imidazoles, available commercially as 2M7, 2E4MN, 2PZ-CN, 2PZ-CNS, P0505, L07N from Shikoku Chem. Corp. or Curezol 2MZ from Air Products. Additionally suitable as crosslinkers are HMTA (hexamethylenetetramine) additives.

Furthermore, amines as well, especially tertiary amines, can be used for acceleration.

In a favorable procedure it is also possible, furthermore, to use plasticizers. Here, in one preferred embodiment of the invention, use may be made of plasticizers based on polyglycol ethers, polyethylene oxides, phosphate esters, aliphatic carboxylic esters, and benzoic esters. Moreover, aromatic carboxylic esters, relatively high molecular weight diols, sulfonamides, and adipic esters can be used as well.

Additionally it is possible, optionally, for fillers (e.g., fibers, carbon black, zinc oxide, titanium dioxide, chalk, solid or hollow glass beads, microbeads made of other materials, silica, silicates), nucleators, expandants, adhesion-boosting additives, and thermoplastics, compounding agents and/or aging inhibitors, in the form for example of primary and secondary antioxidants or in the form of light stabilizers, to have been added.

In a further preferred embodiment, further additives are added to the elastomer, such as, for example, polyvinyl formal, polyacrylate rubbers, chloroprene rubbers, ethylene-propylene diene rubbers, methyl-vinyl-silicone rubbers, fluorosilicone rubbers, tetrafluoroethylene-propylene copolymer rubbers, butyl rubbers, and styrene-butadiene rubbers.

Polyvinyl butyrals are available as Butvar™ from Solucia, as Pioloform™ from Wacker, and as Mowital™ from Kuraray. Polyacrylate rubbers are available for example as Nipol AR™ from Zeon. Chloroprene rubbers are available for example as Baypren™ from Bayer. Ethylene-propylene-diene rubbers are available for example as Keltan™ from DSM, as Vistalon™ from Exxon Mobile, and as Buna EP™ from Bayer. Methyl-vinyl-silicone rubbers are available for example as Silastic™ from Dow Corning and as Silopren™ from GE Silicones. Fluorosilicone rubbers are available for example as Silastic™ from GE Silicones. Butyl rubbers are available for example as Esso Butyl™ from Exxon Mobile. Styrene-butadiene rubbers are available for example as Buna S™ from Bayer, and Europrene™ from Eni Chem, and as Polysar S™ from Bayer.

Polyvinyl formals are available as Formvar™ from Ladd Research.

In a further preferred embodiment, further additives are added to the elastomer, such as, for example, thermoplastic materials from the group of the following polymers: polyurethanes, polystyrene, acrylonitrile-butadiene-styrene terpolymers, polyesters, unplasticized polyvinyl chlorides, plasticized polyvinyl chlorides, polyoxymethylenes, polybutylene terephthalates, polycarbonates, fluorinated polymers, such as polytetrafluoroethylene, for example, polyamides, ethylene-vinyl acetates, polyvinyl acetates, polyimides, polyethers, copolyamides, copolyesters, polyolefins, such as polyethylene, polypropylene, polybutene, polyisobutene, for example, and poly(meth)acrylates.

The bond strength of the heat-activatable adhesive can be increased by means of further deliberate additization. Thus, for example, polyimine copolymers or polyvinyl acetate copolymers can also be used as bond strength promoter additives.

Release Liner

The release liner used in accordance with the invention has a polyolefin film on at least one side.

The release liner to which hot transfer lamination takes place in the method of the invention is a liner which on thermal activation, and hence inter alia in the hot transfer laminating operation itself, develops a slight pressure-sensitive adhesion. Where the assembly formed of release liner and layer of the heat-activatable adhesive is cooled again, the adhesion of the two layers to one another is retained. It has been observed that, surprisingly, the heat-activatable adhesive can be transfer-laminated again outstandingly from the release liner onto the desired substrate to be bonded, and so the substrate can then be bonded as desired.

In the wider sense, the release liners themselves can be regarded as heat-activatable films, which on thermal activation develop pressure-sensitive adhesion at least on their surface.

The pressure-sensitive adhesion of the release liners and therefore the adhesion of the release liner layer and of the heat-activatable adhesive layer may be controlled in particular through the choice of the temperature in the hot transfer laminating operation; accordingly, the detachability of the heat-activatable adhesive can be adjusted for the particular intended application of the diecut that is later present. As a result of the method of the invention, therefore, it is possible, advantageously, to produce assemblies which are composed of a layer of a heat-activatable adhesive and of a release liner and in which the detachment force of the two layers from one another can be predefined and can be adapted to particular profiles of requirements.

It is advantageous to use release liners whose glass transition temperature is at least 20° C., preferably at least 30° C., lower than the glass temperature of the heat-activatable PSA. Through a suitable choice of the temperature in the hot transfer laminating operation, the release liner is then caused to develop its surface pressure-sensitive adhesion, but the heat-activatable adhesive layer is not yet activated and therefore is present in a nontacky form.

With very great advantage, coextruded release liners are used. In its simplest form, the release liner is composed of a coextruded film of a polyolefin and of a hard filmic material such as polyester, PMMA (polymethyl methacrylate), polyimide, polyethylene naphthalate, polyurethane or polyamide. The films are preferably produced by coextrusion.

In the sense of the invention it is also possible, furthermore, with outstanding effect, for films laminated together to have been used, or, for example, PE (polyethylene) or PP (polypropylene) may have been coated subsequently on the hard side, in particular through solution or from the melt. In a further form, however, multilayer films may also be used. The condition in each case is that the polyolefin side faces the heat-activatable adhesive.

One very preferred embodiment uses polyolefins, especially poly-α-olefins, which in particular possess a glass transition temperature which is lower by 20° C., more preferably by 30° C., than that of the heat-activatable adhesive. In particular it is possible with advantage to use release liners of this kind for such heat-activatable, polyolefin-based PSAs.

The polyolefins of the release liner—especially of the coextruded release liner—preferably have glass transition temperatures of +55° C. to +150° C. The bond strength of these polymers can be increased through deliberate additization. Thus it is advantageous, for example, to use polyimine copolymers or polyvinyl acetate copolymers as bond strength promoter additives.

To achieve the desired glass transition temperature, here as well again, preferably, the monomers used for producing the release liners, and also their amounts, are chosen such that the desired temperature results when equation (E1) is applied.

In order to find an optimum range, the molecular weight and the comonomer composition as well is varied. In order to set a low glass transition temperature, it is preferred to use polymers having a medium or low molecular weight. It is also possible to mix low molecular weight polymers with high molecular weight polymers. Particularly preferred embodiments use polyethylenes, polypropylenes, polybutylenes, polyhexenes or copolymers of polyethylene, polypropylene, polybutylene or polyhexene.

In a further form the coextruded release liner may have a silicone layer as a repellent layer. This layer is applied on the hard side of the coextruded film, in other words on the side of the film opposite to the polyolefin side. This form of the release liner is preferred when, for example, no liner is used for the diecutting operation and the diecuts are rolled up directly on the coextruded release liner. In that case the diecuts do not stick to the reverse (the siliconized side) of the next turn.

In a further form of the invention, the coextruded release liner may have microstructuring on the polyolefin side. This microstructuring may be embossed onto the polyolefin side, for example, by means of an engraving roller, with heat. By means of this procedure it is possible further to set the adhesion between the release liner and the heat-activatable adhesive layer, more particularly such that the contact area between the two layers is reduced and the detachability of the heat-activatable PSAs—more particularly in the form of the diecuts—from the release liner is facilitated.

Release liners of this kind are available commercially, for example, from the company Loparex under the trade name FILM PLUS™, and can be used with outstanding effect in accordance with the invention.

In a further variant embodiment of the invention the topography of the release liner on the polyolefin side is transferred in inverted form onto the heat-activatable adhesive. The topography consists of coherent elevations, which may be either rounded or angular in construction. The elevations preferably occupy at least 2% of the total area and/or not more than 65% of the total area. In one preferred embodiment the fraction of the elevations is at least 5%. The remaining area ought preferably to be planar. In a further embodiment of the invention, however, the planar area may also have a microroughness, but this microroughness should be below the height of the elevations.

By means of a topography of this kind it is also possible further to adjust the adhesion between the release liner and the heat-activatable adhesive layer, in this case, in particular, such that the contact area between the two layers is increased and the detachability of the heat-activatable PSAs—especially in the form of the diecuts—from the release liner is hindered: in other words, higher detachment forces must be expended.

The coextruded release liners possess preferably a total layer thickness of 25-350 µm, more preferably of 50-250 µm. The polyolefin layer preferably has at least a layer thickness of 2 µm. The polyolefin layer here ought to be kept as thin as possible, so that in the subsequent diecutting operation the hard reverse of the release liner, PET, for example, acts as a hard abutment for the diecutting blades.

Laminating Operation:

After the PSA has been prepared, it is coated initially onto a carrier material. This may be a permanently remaining carrier material or else in particular may be a first temporary carrier material (a substrate present temporarily). Typically a first temporary carrier material, a release paper, for example, is used, though this has the disadvantages described at the outset for the diecutting operation.

Where permanent carrier materials are used, those suitable are the materials that are customary and familiar to the person skilled in the art, especially non-woven-based materials, since the latter cause less disruption to the diecutting operation: such as, in particular, for example, films (polyesters, PET, PE, PP, BOPP, PVC; HDPE, LDPE).

A feature of the method of the invention, then, is that the heat-activatable adhesive layer is laminated by one exposed side, prior to diecutting, onto a second temporary carrier material, the release liner described in more detail above, with accompanying exposure to temperature.

For the purposes according to the invention it may also be advantageous to prepare double-sided heat-activatable adhesive sheets for the diecutting operation. In this case a carrier material is coated on both sides with the heat-activatable adhesive, and then one of the adhesive layers is laminated onto the release liner. It may be advantageous here to provide the other adhesive layer in the interim with a temporary carrier material or liner material.

For the following hot laminating operation, the release liner ought preferably to have a temperature resistance, so that no damage occurs. The requisite temperature resistance and hence the laminating temperature are dependent on the activation temperature or glass transition temperature of the heat-activatable adhesive.

The activating temperature in the hot laminating operation is advantageously chosen so as to be situated within a temperature range between the glass transition temperature of the release liner and the glass transition temperature of the heat-activatable adhesive. By this means it is possible to bring about a situation in which the tack of the surface of the release liner is brought about, while the heat-activatable adhesive layer continues to remain in a nontacky form during this stage of the operation.

In one advantageous variant embodiment of the invention the heat-activatable adhesive, present in particular in a form in which it is coated on the first (temporary) carrier, a release paper, for example, is laminated together with the release liner—in particular, with the coextruded release liner. In this case the polyolefin side of the release liner faces the heat-activatable adhesive layer.

In the same way, the adhesive layer present on a permanent carrier can be laminated onto the release liner.

A first lamination ("preliminary lamination") may take place over cold rolls (at room temperature—then the release liner is only lying on the heat-activatable film). After that or, if no preliminary lamination is carried out, as a "first" lamination, a lamination under activating conditions (hot lamination) is carried out; in particular by means of heated rollers, with introduction of heat and pressure. Transfer with pressure takes place, for example, by means of at least one laminating roll. Rolls used here are preferably rubberized rolls.

For the hot laminating operation the speed, the pressure and the temperature are set as a function of the activation temperature of the heat-activatable adhesive and of the glass transition temperature of the polyolefin of the coextruded release liner. Through the choice of the stated parameters it is possible to define the adhesion between the release liner and the heat-activatable PSA layer.

The hot roller laminator is operated preferably with a pressure range between 1 and 20 bar. The temperature range is preferably between 50 and 170° C.; it can be set as a function of the activation temperature of the heat-activatable adhesive. Furthermore, different hot roller laminators can be combined with one another. The transit speeds are between 0.5 and 50 m/min, more preferably between 2 and 10 m/min. The hot rollers of the roller laminator may be heated from the inside or by an external heat source.

As the laminating speeds go up, the lamination temperature is raised in order to introduce sufficient heat, which causes the polyolefin layer of the release liner, more particularly of the coextruded release liner, to soften and become tacky.

Diecutting Operation

The method of the invention includes a diecutting operation. For diecutting operations of this kind it is possible, to outstanding effect, to make use, for example, of rotary diecutting. The diecutting operation may be a full-cut or kiss-cut operation. Correspondingly it is possible to carry out the following variants advantageously:

the diecutting operation severs the adhesive on the release liner completely;
the diecutting operation severs the adhesive on the release liner incompletely;
the diecutting operation severs the adhesive-coated carrier material completely;
the diecutting operation severs the adhesive-coated carrier material only partly or not at all.

The lamination of the heat-activatable adhesive onto the release liner, more particularly onto the coextruded release liner, and the subsequent diecutting operation may be carried out advantageously in an inline operation, in other words in a combined unit and/or continuous sequence. Alternatively, however, the laminating operation and the diecutting operation may also be separated from one another.

Furthermore, it may be of advantage if, prior to diecutting, a liner, made of PET, for example, is laminated onto the open side of the heat-activatable adhesive, in order to protect this adhesive when the assembly is being wound up or is being transported or stored.

Variant A, Continuous Process:

1. Unwinding of the heat-activatable adhesive tape with the release liner.
2. Lamination of a siliconized liner film, upstream of the rotary diecutting cylinder, from above, onto the open side of the heat-activatable adhesive tape.
3. Rotary diecutting process: Severing of the siliconized liner film and of the adhesive assembly. Ideally the diecutting blades perform only minimal penetration of the polyolefin layer of the release liner.
4. Stripping: Removal of the matrix net. The diecuts remain on the release liner.
5. Winding up of the completed products (i.e., diecuts lined with liner film and on original release material as carrier) and winding up of the stripped matrix.

Variant B, Continuous Process:

1. Unwinding of the heat-activatable adhesive tape with the release liner.
2. Rotary diecutting process: Severing of the adhesive assembly. Ideally the diecutting blades perform only minimal penetration of the polyolefin layer of the release liner.
4. Stripping: Removal of the matrix net. The diecuts remain on the release liner.
5. Winding up of the completed products (i.e., diecuts on original release material as carrier (release liner)) and winding up of the stripped matrix.

Examples of the speed at which the assembly comprising heat-activatable adhesive and release liner, more particularly, coextruded release liner, run through the unit are 0.1 m/min to 100 m/min. Typical speeds for diecutting operations in the present-day are 10 to 30 m/min.

For further diecutting operations it is also possible in an outstanding way, for example, to use flatbed diecutters. In this case as well the diecutting operation may be a full-cut or kiss-cut operation.

Variant C, Discontinuous Process:

1. Unwinding of the heat-activatable adhesive tape with the release liner.
2. Lamination of a siliconized liner film, upstream of the flatbed diecutting unit, from above, onto the open side of the heat-activatable adhesive tape.
3. Flatbed diecutting process: Severing of the siliconized liner film and of the adhesive assembly. Ideally the diecutting blades perform only minimal penetration of the polyolefin layer of the release liner.
4. Stripping: Removal of the matrix net. The diecuts remain on the release liner.
5. Winding up of the completed products (i.e., diecuts lined with liner film and on original release material as carrier) and winding up of the stripped matrix.

Variant D, Discontinuous Process:
 1. Unwinding of the heat-activatable adhesive tape with the release liner.
 2. Flatbed diecutting process: Severing of the adhesive assembly. Ideally the diecutting blades perform only minimal penetration of the polyolefin layer of the release liner.
 4. Stripping: Removal of the matrix net. The diecuts remain on the release liner.
 5. Winding up of the completed products (i.e., diecuts on original release material as carrier (release liner)) and winding up of the stripped matrix.
Experiments
 The invention is described below by means of experiments, without wishing any unnecessary restriction to arise from the choice of the samples investigated.
 Production of the Samples
 Preparation of the Heat-Activatable Adhesive Example 1

50% by weight of Breon N36 C80 (nitrile rubber) from Zeon, 40% by weight of phenol-novolak resin Durez 33040 blended with 8% of HMTA (Rohm and Haas), and 10% by weight of the phenol resole resin 9610 LW from Bakelite were prepared as a 30% strength solution in methyl ethyl ketone in a kneading apparatus. The duration of kneading was 20 h. The heat-activatable adhesive was subsequently coated from solution onto a graduated glassine liner (70 μm, Laufenberg) and dried at 100° C. for 10 minutes. The layer thickness after drying was 100 μm.

Example 2

50% by weight of Nipol N1094-80 (nitrile rubber) from Zeon, 40% by weight of phenol-novolak resin Durez 33040 blended with 8% of HMTA (Rohm and Haas), and 10% by weight of the phenol resole resin 9610 LW from Bakelite were prepared as a 30% strength solution in methyl ethyl ketone in a kneading apparatus. The duration of kneading was 20 h. The heat-activatable adhesive was subsequently coated from solution onto a graduated glassine liner (70 μm, Laufenberg) and dried at 100° C. for 10 minutes. The layer thickness after drying was 100 μm.
Transfer Lamination onto the Coextruded Liner
 Examples 1 and 2 were each laminated onto a coextruded PET/PE liner from Loparex. The liner possesses a total thickness of 90 μm, the PE layer having a thickness of about 20 μm. On the reverse (PET side) the liner features siliconization. An easy-release silicone system is applied, with an application of approximately 0.5 g/m² silicone.
 Examples 1 and 2 were each run together with the coextruded release liner through a hot roller laminator, the coextruded PET/PE liner being directed with the PE side facing the heat-activatable adhesive. The laminating temperature was 90° C., and both rubber rolls of the roller laminator were heated. The pressure was 2 bar and the speed was 1 m/min. Subsequently, before winding, the glassine liner was removed and only the heat-activatable adhesive with the coextruded PET/PE liner was wound up.
Overview of the Diecutting Methods Employed:
Rotary Diecutter with Continuous Matrix Stripping.
 A rotary diecutter from SMO, Germany, was used. For the different diecut forms, diecutting cylinders from the company RotoMetrics International Ltd were used in each case.
 The roll width of the adhesive materials used was 130 mm. The diecutting trials with the heat-activatable adhesive were carried out by kiss-cutting on the coextruded PET/PE liner.

Upstream of the rotary diecutting cylinder, in some cases a second siliconized auxiliary release material was laminated from above onto the open adhesive side of the trial adhesive tape. The auxiliary release material used here was a single-sidedly siliconized, easy-release PET film with a layer thickness of 36 μm.
 The matrix was stripped at an angle of around 80°. The diecutting speed was 18 m/min.
Target product 1:
 Square diecuts without connecting bridges. The diameter of the diecuts is 14 mm from tip to tip.
Target product 2:
 Square diecuts without connecting bridges. The diameter of the diecuts is 5 mm from tip to tip.
Target product 3:
 Circular diecuts. The circular diameter of the diecuts is 8 mm.
Target products 4:
 Square diecuts with direct connecting edge. The side-edge length of the diecuts is 9 mm.

TABLE 1

Criteria for assessing the fault frequency in the diecutting trials.

| Fault rate | Evaluation |
|---|---|
| 0% | The matrix was removable with no problems. In diecutting trials, over 250 linear meters there was not a single defect, i.e., no diecut was removed during the stripping operation. |
| 1-99% | Percentage number of defects (missing diecuts) over 250 linear meters. The fault rate is based on the total number of possible diecuts over 250 linear meters. |
| 100% | It was not possible to separate the matrix from the diecuts. No separated diecuts over 250 linear meters. |

TABLE 2

Overview of the trial adhesive tapes used, and the diecutting results

| Examples | Target products | Diecutting method Rotary diecutter with continuous matrix stripping |
|---|---|---|
| 1 | 1 | 0% |
| 2 | 1 | 0% |
| 1 | 2 | 0% |
| 2 | 2 | 0% |
| 1 | 3 | 0% |
| 2 | 3 | 0% |
| 1 | 4 | 0% |
| 2 | 4 | 0% |

The diecutting trials demonstrate that all of the products, with the various diecut shapes, can be diecut and lattice-stripped without problems on the coextruded PET/PE release liner.
 To investigate the further suitability, the circular diecuts (target products 3) were laminated onto an aluminum sheet 1 mm thick at 120° C. with the aid of a hot roller laminator. Following hot lamination, the diecut adhered to the aluminum sheet and the coextruded PET/PE liner was removable with no problems. Thereafter the bond strength of examples 1 and 2 was ascertained.
 The bond strength was measured using 2 aluminum sheets each with a layer thickness of 1 mm, in analogy to DIN EN 1465. The measurement values were reported in N/mm². For the adhesive bonding, curing was carried out at 120° C. for 8 minutes in a hot press under 50 N/cm².

The results are listed in table 3 below:

|  | Dynamic shear strength [N/mm²] |
| --- | --- |
| Example 1 | 6.5 |
| Example 2 | 7.7 |

From table 3 it is apparent that high bond strengths are achievable with examples 1 and 2.

The invention therefore presents the principle of providing a release liner material which, in accordance with its intended use, is typically made at least partly anti-adhesive, in other words is intended to avoid the sticking of adhesive to it, with temporary adhesiveness at least to an extent such that a layer of the heat-activatable adhesive, but one which at the time of deposition is itself not tacky, can be deposited adheringly on it. Following deposition, the adhesion of the layers to one another is retained until the heat-activatable adhesive film is taken off again, in particular by transfer to a substrate to be bonded. Surprisingly, the operation of removing the heat-activatable adhesive from the release liner is accomplished flawlessly and without residue, and the detachment forces required can be influenced in a defined way through the parameters of the method of the invention.

The method differs substantially from the typical procedure of depositing heat-activatable adhesives on carriers and bringing about the adhesion from the tackiness of the adhesive.

The invention claimed is:

1. A method of producing diecuts from heat-activatable adhesive films, which comprises
   a. coating a heat-activatable adhesive initially onto a first carrier material,
   b. laminating the heat-activatable adhesive layer onto a release liner having a glass transition temperature at least 20° C. lower than the glass transition temperature of the heat-activatable adhesive, at a temperature between the glass transition temperature of the release liner and the glass transition temperature of the heat-activatable adhesive, the release liner having at least one polyolefin-based surface, and the polyolefinic surface being nontacky at room temperature and having pressure-sensitive adhesive properties at the temperature at which said lamination is carried out,
   c. and diecutting the heat-activatable adhesive layer on the release liner.

2. The method of claim 1, wherein said release liner has a glass transition temperature of at least 30° C. lower than the glass temperature of the heat-activatable pressure-sensitive adhesive.

3. The method of claim 1, wherein the release liner is an at least two-layer film.

4. The method of claim 3, wherein the release liner is a coextruded film comprising a polyolefin layer and a layer of polyester, polymethyl methacrylate, polyimide, polyethylene naphthalate, polyurethane or polyamide.

5. The method of claim 3, wherein the release liner is a film comprising a polyolefin layer and a layer of polyethylene or polypropylene.

* * * * *